(12) United States Patent
Lin et al.

(10) Patent No.: US 6,176,250 B1
(45) Date of Patent: Jan. 23, 2001

(54) PRESSURE BALANCED VALVE ASSEMBLY FOR PROPORTIONALLY MIXING HOT WATER AND COLD WATER ENTERING THEREIN

(75) Inventors: Tin-Kai Lin; Hung-Yin Chen, both of Taichung (TW)

(73) Assignee: Metal Industries Research Development Center, Taichung (TW)

( * ) Notice: Under 35 U.S.C. 154(b), the term of this patent shall be extended for 0 days.

(21) Appl. No.: 09/336,799

(22) Filed: Jun. 21, 1999

(51) Int. Cl.[7] .................................................. G05D 11/03
(52) U.S. Cl. ........................................ 137/98; 137/454.6
(58) Field of Search ........................ 137/98, 100, 454.6

(56) References Cited

U.S. PATENT DOCUMENTS 3,192,939 * 7/1965 Moen ................................... 137/100
5,983,918 * 11/1999 Chang .................................... 137/98

* cited by examiner

Primary Examiner—Stephen M. Hepperle
(74) Attorney, Agent, or Firm—Charles E. Baxley

(57) ABSTRACT

A pressure balanced valve assembly includes a casing having a proportioning member received in a passage defined in the casing. Two inlets and two outlets are respectively defined in two opposite ends of the casing. The proportioning member has a central passage defined therethrough, two apertures defined through the wall of the proportioning member and communicating with the central passage. The position of each of the two apertures of the proportioning member is moved relative to the two inlets of the casing when the water pressure in the casing moves the proportioning member so as to change the opening of the two inlets of the casing by the wall of the proportioning member.

3 Claims, 5 Drawing Sheets

PRESSURE BALANCED VALVE ASSEMBLY FOR PROPORTIONALLY MIXING HOT WATER AND COLD WATER ENTERING THEREIN

FIELD OF THE INVENTION

The present invention relates to a pressure balanced valve assembly for proportionally mixing the volume of hot water and cold water, and more particularly, to a pressure balanced valve assembly having a proportioning member received therein which is moved to control the volume of the hot water and the cold water entering the valve assembly according to the water pressure.

BACKGROUND OF THE INVENTION

A conventional valve assembly is generally used in a pipe system connected to a faucet or a shower head for mixing the cold water and the hot water so that users can get warm water mixed by the hot water and the cold water by operating the lever of the faucet. The conventional valve assembly typically includes a balanced member which is urged at two sides thereof by two springs so that when either one of the hot water or the cold water introduces a high pressure to push the balanced member to an extreme position, the user will be incurred with the hot water with a very high temperature or the cold water with a unexpected low temperature. In order to overcome the spring force so that the water pressure has to be raised to a certain level and this prolongs the reaction time of the valve. That is to say, the conventional valve assembly is not sensitive enough to properly mix the volume of the hot water and the cold water. Furthermore, the springs will reach to their fatigue critical point after a period of time and get rust. This makes the hot water or the cold water entering the valve assembly abnormally and could hurt the users.

The present invention intends to provide a pressure balanced valve assembly which has a proportioning member which is moved relative to the inlets of the hot water and the cold water according to the water pressure applied to the proportioning member. By the valve assembly of the present invention, a proper mixing feature of the hot water and the cold water can be reached so that the inherent disadvantages of the conventional valve assembly can be well mitigated and/or obviated.

SUMMARY OF THE INVENTION

In accordance with one aspect of the present invention, there is provided a pressure balanced valve assembly comprising a casing having a passage defined therein for receiving a proportioning member therein. Two inlets and two outlets are respectively defined in two opposite ends of the casing, the two inlets and the two outlets respectively communicating with the passage. The proportioning member has a central passage defined therethrough and two apertures are defined through the wall thereof and communicate with the central passage. The two apertures movably communicate with the two inlets of the casing when the proportioning member is moved and the two outlets of the casing communicate with the central passage.

The object of the present invention is to provide a pressure balanced valve assembly which will automatically adjust the volume of the entry of the hot water or the cold water so as to mix the hot water and the cold water properly.

Another object of the present invention is to provide a pressure balanced valve assembly which does not need springs received in the casing so as to avoid the inherent shortcomings found in the conventional valve assembly.

Further objects, advantages, and features of the present invention will become apparent from the following detailed description with appropriate reference to the accompanying drawings.

DETAILED DESCRIPTION OF THE PREFERRED EMBODIMENTS

Figure 1:
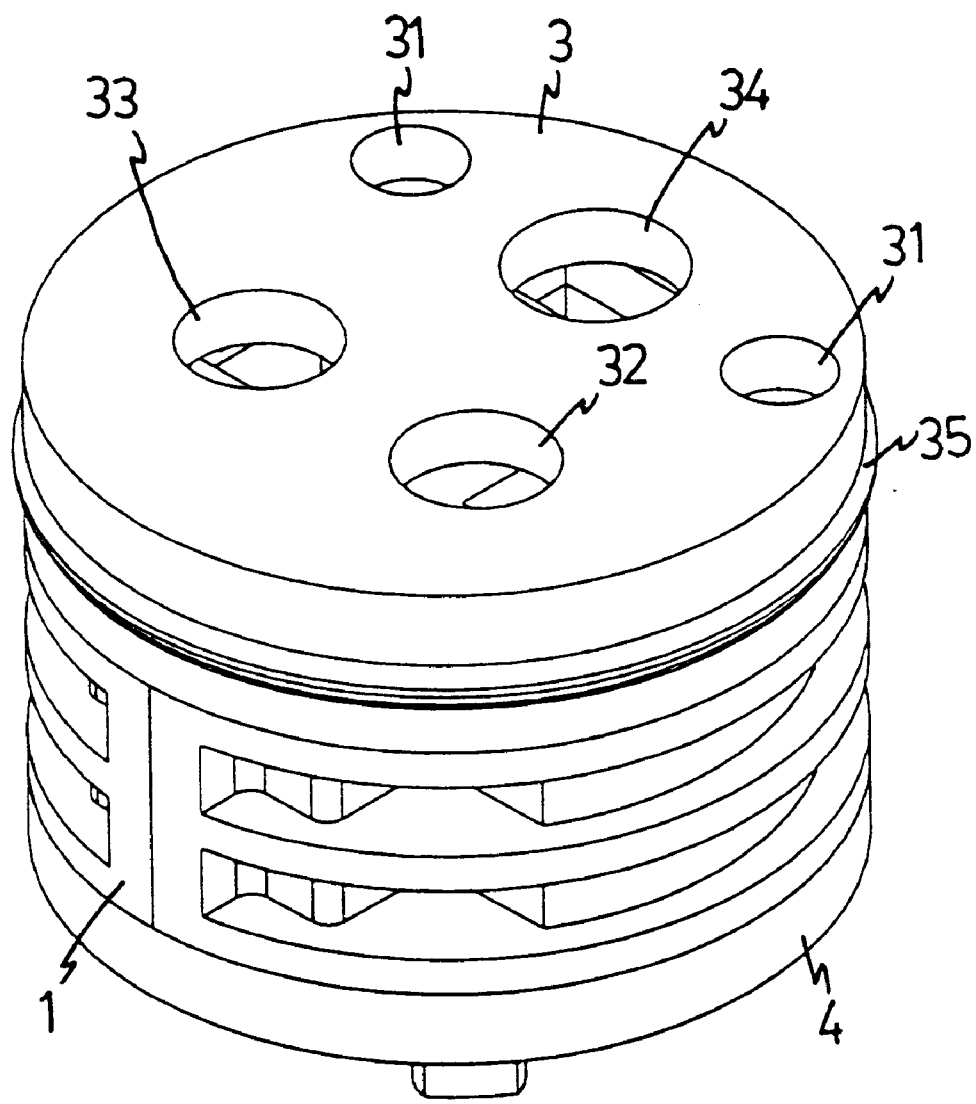
FIG. 1 is a perspective view of the valve assembly in accordance with the present invention.
Figure 2:
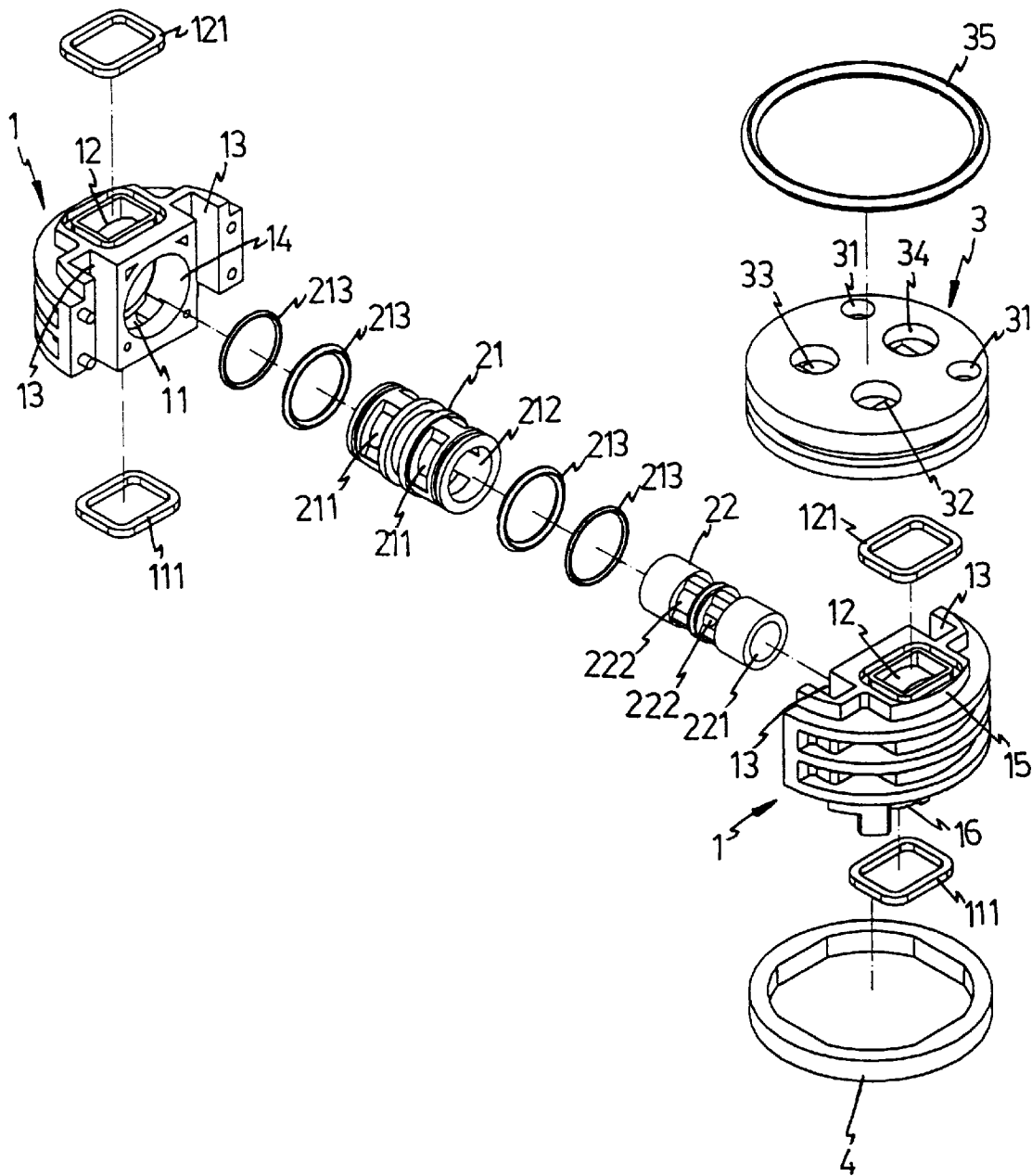
FIG. 2 is an exploded view of the valve assembly in accordance with the present invention.
Figure 3:
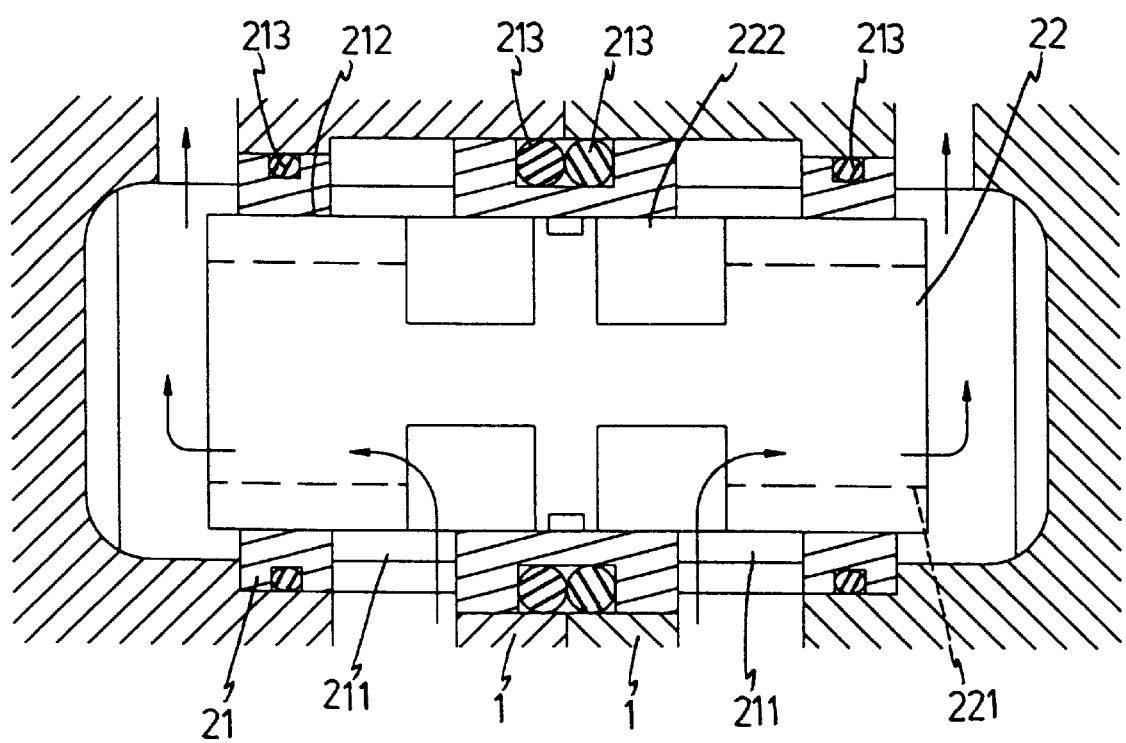
FIG. 3 is a side elevational view, partly in section, of the valve assembly in accordance with the present invention.

Referring to FIGS. 1 to 3, the pressure balanced valve assembly in accordance with the present invention comprises a casing (1) which is composed of two identical halves and each of the halves has an inlets (11) and an outlet (12) respectively defined in two opposite ends of the casing (1). A protrusion (15) extends from the end having the outlet (12) of each of the halves and another protrusion (16) extends from the end having the inlet (11) of each of the halves so that the two halves can be combined together to become the casing (1) by engaging a ring (4) to the two protrusions (16) and a top cap (3) to the two protrusions (15). A passage (14) is defined in the casing (1) and communicates with the two inlets (11) and the two outlets (12). Two ways (13) are defined in the casing (1) with the passage (14), the inlets (11) and the outlets (12) located between the two ways (13).

A fixed member (21) is securely engaged with the passage (14) of the casing (1) and has a main passage (212) defined therethrough. The fixed member (21) has two holes (211) defined through the wall thereof and communicating with the two inlets (11) of the casing (1). A proportioning member (22) is movably received in the main passage (212) of the fixed member (21) and has a central passage (221) defined therethrough. Two apertures (222) are defined through the wall of the proportioning member (22) and communicate with the central passage (14). The two apertures (222) communicate with the two holes (211) of the fixed member (21) and the two inlets (11) of the casing (1). The two outlets (12) of the casing (1) communicate with the central passage (221).

Figure 4:
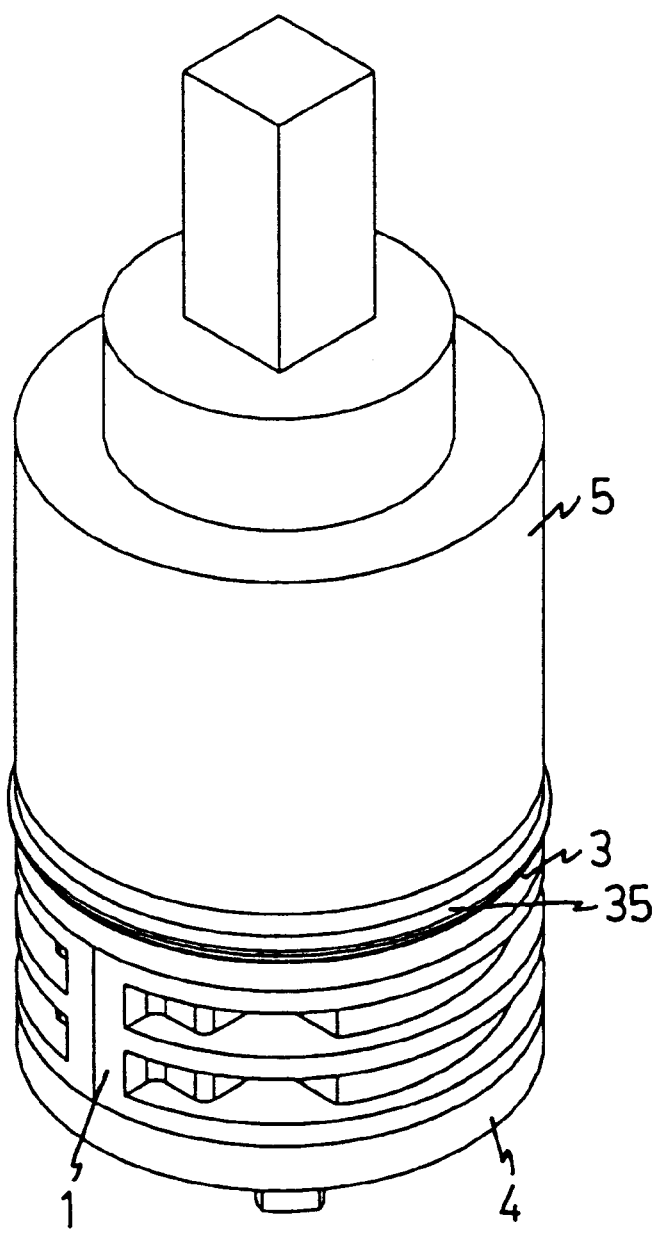
FIG. 4 is a perspective view of the valve assembly in accordance with the present invention with a mixing mechanism attached thereto.

The top cap (3) is fixedly mounted to the end having two outlets (12) of the casing (1) and has a first hole (32) and a second hole (33) respectively defined therethrough. The first hole (32) and the second hole (33) respectively communicate with the two outlets (12) in the casing (1). That is to say, the first hole (32) can be the hot water hole and the second hole can be the cold water hole. Two engaging recesses (31) are defined in the top cap (3) so as to be connected to a conventional mixing mechanism (5) as shown in FIG. 4.

Figure 5:
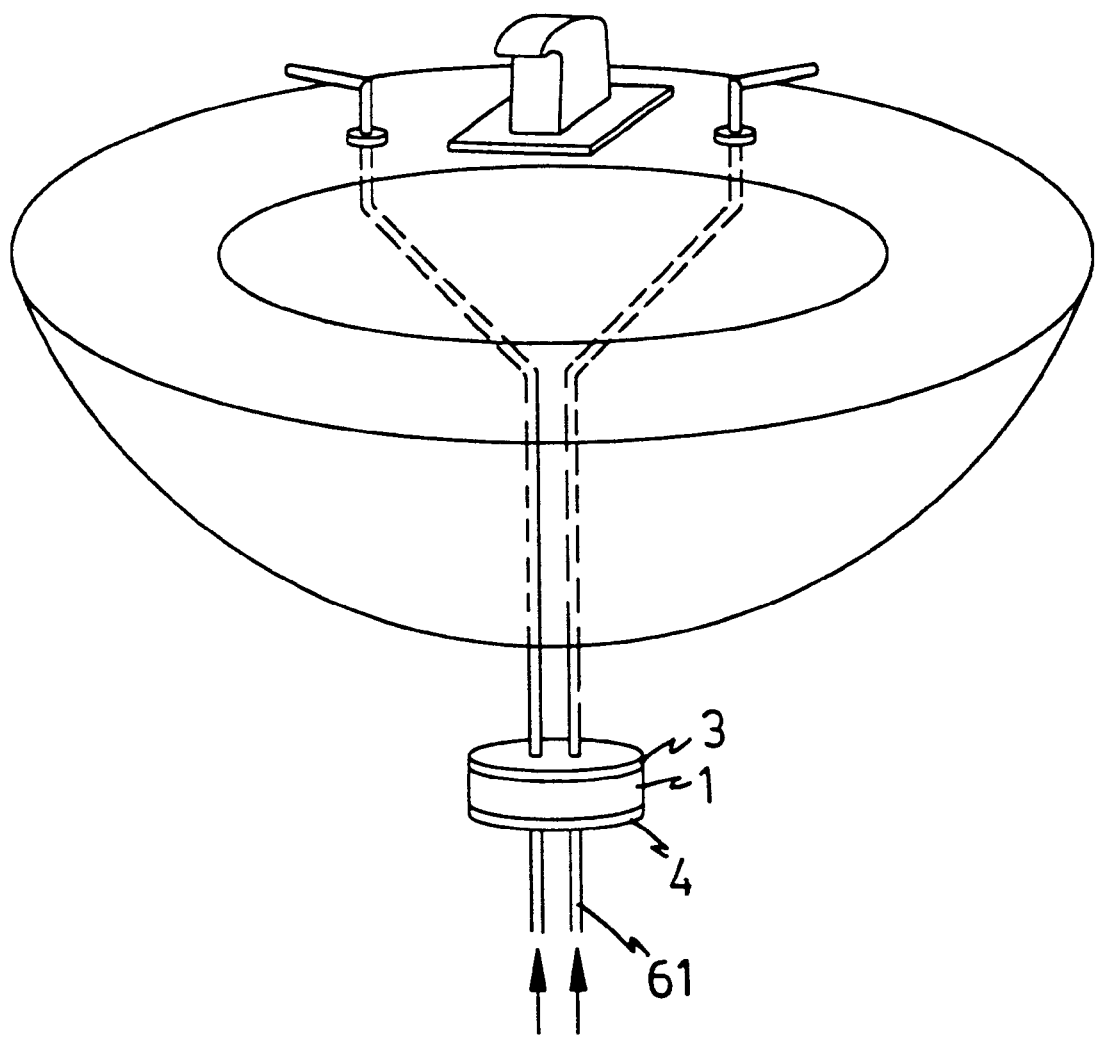
FIG. 5 is an illustrative view to illustrate the valve assembly of the present invention is connected with a hot water pipe and a cold water pipe.

Further referring to FIG. 5, the hot water and the cold water enter into the casing (1) from the two inlets (11) via the opening between the holes (211) and the apertures (222) by two water pipes (61), and flow out from the outlets (12).

When the hot water enters in the casing (1) with a much larger amount than the amount of the cold water, the pressure will move the proportioning member (22), the opening of the inlet (11) and the hole (11) through which the hot water enters will be reduced by the wall of the proportioning member (22) so that the amount of the hot water will then reduced. That is to say, the positions of the two apertures (222) are moved relative to the holes (211) so as to change the opening defined between the holes (211) and the wall of the proportioning member (22).

In order to provide a better seal feature, four seals (213) are mounted to the fixed member (21) and two seals (111, 121) are respectively mounted to the protrusions (15, 16) of the casing (i). A seal (35) is mounted to the top cap (3). A release hole (34) is defined through the top cap (3) so that the pressure balanced valve assembly can be connected to different type of faucet.

The invention is not limited to the above embodiment but various modification thereof may be made. It will be understood by those skilled in the art that various changes in form and detail may made without departing from the scope and spirit of the present invention.

What is claimed is:

1. A valve assembly comprising:

a casing (1) having a passage (14) defined therein with two inlets (11) and two outlets (12) respectively defined in two opposite ends of said casing (1), said two inlets (11) and said two outlets (12) respectively communicating with said passage (14), said casing (1) has a protrusion (15) extending therefrom;

a top cap (3) fixedly mounted to said end having two outlets (12) of said casing (1) and having a first hole (32) and a second hole (33) respectively defined therethrough, said first hole (32) and said second hole (33) respectively communicating with said two outlets (12) in said casing (1), said protrusion (15) of said casing (1) engaged with said top cap (3), and a movable member (22) movably received in said passage (14) and having a central passage (221) defined therethrough, two apertures (222) defined through the wall of said movable member (22) and communicating with said central passage (14), said two apertures (222) communicating with said two inlets (11) of said casing (1) and said two outlets (12) of said casing (1) communicating with said central passage (221), said movable member (22) being moved within said passage (14) to change the position of said apertures (222) relative to said inlets (11).

2. The valve assembly as claimed in claim 1 further comprising a fixed member (21) securely engaged with said passage (14) of said casing (1) and said fixed member having a main passage (212) defined therethrough, said proportioning member (22) movably received in said main passage (212) of said fixed member (21), said fixed member (21) having two holes (211) defined through the wall thereof and communicating with said two inlets (11) of said casing (1).

3. The valve assembly as claimed in claim 1 further comprising two engaging recesses (31) defined in said top cap (3).

* * * * *